P. RASMUSSEN.
AUTOMATIC STACKING MACHINE FOR CAKES, CRACKERS, AND OTHER ARTICLES.
APPLICATION FILED JAN. 6, 1916.

1,217,345.  Patented Feb. 27, 1917.
4 SHEETS—SHEET 1.

P. RASMUSSEN.
AUTOMATIC STACKING MACHINE FOR CAKES, CRACKERS, AND OTHER ARTICLES.
APPLICATION FILED JAN. 6, 1916.

1,217,345.

Patented Feb. 27, 1917.
4 SHEETS—SHEET 2.

Witnesses:
G. Sargent Elliott
Adella M. Fowle

Inventor:
Peter Rasmussen,
By H. S. Bailey Attorney.

P. RASMUSSEN.
AUTOMATIC STACKING MACHINE FOR CAKES, CRACKERS, AND OTHER ARTICLES.
APPLICATION FILED JAN. 6, 1916.

1,217,345.

Patented Feb. 27, 1917.
4 SHEETS—SHEET 3.

P. RASMUSSEN.
AUTOMATIC STACKING MACHINE FOR CAKES, CRACKERS, AND OTHER ARTICLES.
APPLICATION FILED JAN. 6, 1916.

1,217,345.

Patented Feb. 27, 1917.

Witnesses:
G. Sargent Elliott
Adella M. Fowle

Inventor:
Peter Rasmussen
By
H. S. Bailey Attorney.

UNITED STATES PATENT OFFICE.

PETER RASMUSSEN, OF DENVER, COLORADO.

AUTOMATIC STACKING-MACHINE FOR CAKES, CRACKERS, AND OTHER ARTICLES.

1,217,345.   Specification of Letters Patent.   Patented Feb. 27, 1917.

Application filed January 6, 1916. Serial No. 70,627.

*To all whom it may concern:*

Be it known that I, PETER RASMUSSEN, a citizen of the United States of America, residing in the city and county of Denver and State of Colorado, have invented a new and useful Automatic Stacking-Machine for Cakes, Crackers, and other Articles, of which the following is a specification.

My invention relates to improvements in automatic stacking machines for cakes, crackers, and other articles.

The objects of the invention are:

First, to provide an intermittently rotating endless main conveyer for receiving cake and other articles from baking pans, an endless rotating conveyer at the discharge end of the main conveyer, and at right angles thereto, and means for receiving the articles from the main conveyer and depositing them in alined order on the second conveyer, a third or stacking conveyer in line with the second conveyer, means connecting the said second and third conveyers for arranging the articles in horizontal stack or column form, and laterally adjustable guides above the third conveyer for maintaining the articles in stack or column form during their progress toward the discharge end of the said third conveyer.

Further, to provide in connection with a main intermittently rotating receiving conveyer, an alining conveyer at the discharge end of the main conveyer, and means for imparting movement to said conveyers, a receiving plate beneath the discharge end of the main conveyer, means connected with the conveyer operating means for moving said receiving plate out over the alining conveyer, means for quickly retracting said plate whereby articles received thereon from the main conveyer are deposited on the second conveyer in alined order, a third conveyer in line with the second conveyer combining an upwardly inclined and a horizontal portion, a variable choke chute connecting the said second and the inclined portion of the third conveyers for receiving articles and delivering them to the third conveyer in stack or column form, and means for maintaining the column form of the articles during their progress toward the discharge end of the said third conveyer.

These objects are accomplished by the mechanism illustrated in the accompanying drawings, in which:

Fig. 7, is a perspective view of the casting which terminates the discharge end of the main conveyer supporting table.

Similar letters of reference refer to similar parts throughout the several views.

Referring to the accompanying drawings,—

Figures 5, 11, 15:
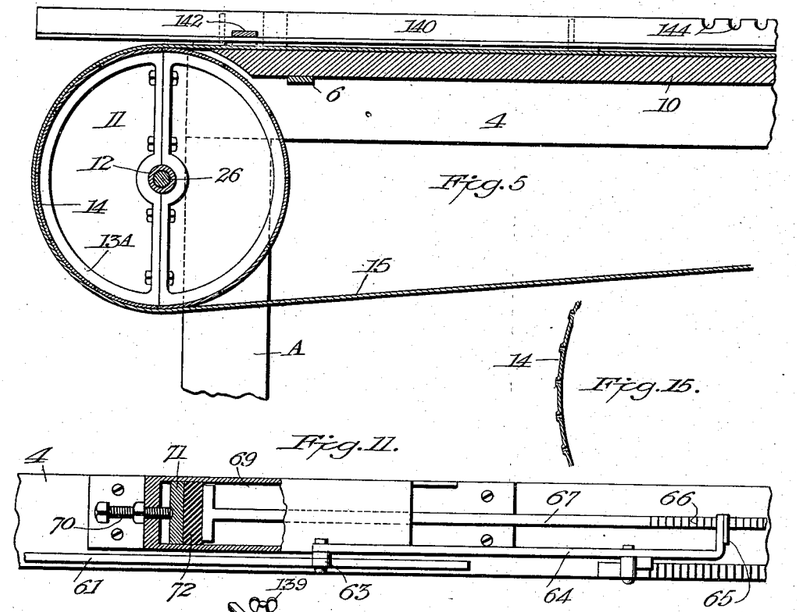
Fig. 5, is a vertical longitudinal sectional view through the forward end of the main conveyer frame, showing the power operated drum around which the conveyer passes.
Fig. 11, is a sectional plan view of the mechanism for moving the receiving plate forward over the second conveyer, and for cushioning the quick return of the same.
Fig. 15, is a sectional view of a portion of the sheet metal plate forming the periphery of the main conveyer drum.
Figure 6:
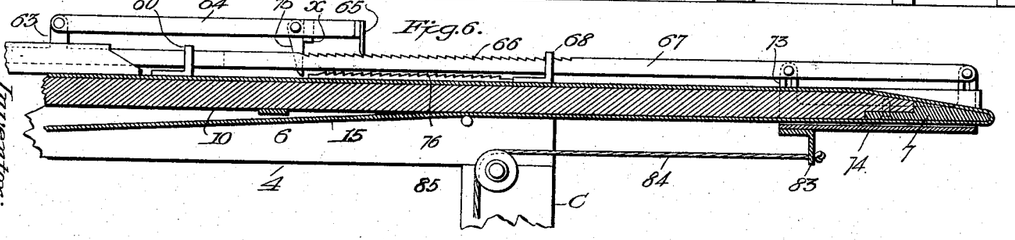
Fig. 6, is a vertical longitudinal sectional view through the discharge end portion of the main conveyer.

The numeral 1 indicates the supporting frame of the main conveyer, 2 the supporting frame of the second conveyer, and 3 the supporting frame of the third or stacking conveyer. The upper side bars 4 of the main conveyer frame support a table frame which comprises angle bars 5, which are secured to the inner sides of the side bars 4, and which are connected at intermediate points by strap irons 6, and at their forward ends by a casting 7, of the form shown in Fig. 7, and comprising a nose portion 8, around which the discharge end of the main conveyer passes, as will be presently described, and a step portion 9, upon which rest the forward ends of boards which constitute a supporting table 10 for the said conveyer. This table extends back nearly to the forward end of the frame, and is supported upon the strap irons 6. Upon the upright standards or legs A of the forward end of the frame 1, is mounted a drum 11, upon a hollow shaft 12, which is mounted at its ends in bearings 13 which are bolted to the standards A. This drum preferably comprises ring shaped supports 13ᴬ, which may be made up of semi-circular members which are bolted together and rigidly secured upon the hollow shaft 12, and a sheet metal cylinder 14, which is slipped upon and secured to said supports. The surface of the cylinder is roughened preferably by forming in the same numerous perforations which are punched through from the inner surface of the cylinder, thereby forming slightly projecting annular rims around each perforation, as will be understood by reference to Fig. 15. An endless canvas conveyer 15 passes around this drum, its upper lap resting upon the table 10, and passing over the nose 8 of the casting 7, at the forward end of the table. From the nose 8 the conveyer passes over and around a roller 16, on a shaft 16ᴬ, which is mounted in adjustable bearings 17, on the under side of the side rails of the frame, and thence forward a short distance and around a roller 18, mounted in bearings 19, which are secured to the middle uprights or legs B of the frame, and then to the drum 11.

The bearings 17 are secured to metal strips 20, which are slidably mounted in guides 21, which are secured to the side bars. The strips 20 have depending abutment lugs 22, against which bear the ends of hand screws 23, which are supported in threaded lugs 24 on strips 25, which are rigidly secured to the under side of the side bars of the frame. Thus by turning the hand screws the conveyer may be given the desired tension or tightness, and is held at this tension by the engagement of the ends of the hand screws 23, with the lugs 22, of the slidable strips 20, to which the bearings of the belt tightening roller 16 are secured.

A solid shaft 26 passes loosely through the hollow shaft 12, and upon the ends of the shaft 26 are rigidly secured arms 27 and 28. The arm 28 is secured midway of its length to the said shaft 26, and near its upper end is mounted a gravity pawl 29, which engages the teeth of a ratchet wheel 30, which is rigidly mounted on the adjacent end of the hollow shaft 12. A vertically disposed, variable throw rock lever 31, is pivotally secured at its upper end to the side rail 4 of the frame 1. This rock lever comprises a flat vertical plate 32, having two or more vertical slots 33, the plate terminating at its opposite ends in T-flanges 34, having alined holes opposite the slots 33, the holes being arranged in opposite rows as clearly shown in Fig. 2.

A hand screw 35 is mounted in a pair of the alined holes on the side of the lever 31, facing the arm 28, and upon this screw is mounted a block 36, the inner end of which is slidably mounted in the adjacent slot 33 of the plate 32, the block being held in its slot by a cap 37 which is bolted to the block and bears against the plate. To this block is pivotally secured one end of a connecting rod 38, the opposite end of which is pivotally secured to the lower end of the arm 28. A hand screw 39 similar to the hand screw 35, is mounted upon the opposite side of the rock lever 31, but out of line with the said hand screw 35, and upon this screw 39 is mounted a threaded block 40 similar to the block 36, the inner end of which enters the adjacent guide slot 33, and is held in sliding engagement therewith by a cap 41.

To the block 39 is pivotally secured one end of a connecting rod 42, the opposite end of which is pivotally connected to a crank wheel 43, which is rigidly mounted on one end of a shaft 44, which is mounted in bearings 45, on the rear standards or legs C of the frame 1.

Upon the opposite end of the shaft 44, is rigidly mounted a belt wheel 46, and a bevel pinion is also rigidly mounted on this shaft between the belt wheel 46 and the adjacent side bar of the frame. A belt 48 passes around the wheel 46, and thence around a pulley 49 on a shaft 50, which is mounted in bearings 51, adjacent the forward end of the frame, which are secured upon horizontal bars E, of the frame, which extend between the legs A and B, a suitable distance below the side bars 4. The shaft 50 carries a stepped pulley 52, which is connected by a belt 53 with a correspondingly stepped pulley 54, on a shaft 55, which is mounted in bearings 56 on the bars E, adjacent the rear end of the frame. The shaft 55 also carries a belt wheel 57 which is connected by a belt 58 with a pulley 59 on the shaft of an electric motor 60, as shown, or with any other suitable power source, the motor being supported upon a platform 6$^A$, which is secured to tie rods 6$^B$, which connect the two sides of the frame. It will thus be seen that power from the motor is transmitted through the belt 58 and wheel 57, to shaft 55 and pulley 54, thence by belt 53 and pulley 52 to shaft 50, and thence by pulley 49, belt 48, wheel 46 and shaft 44 to the crank wheel 43, which reciprocates the connecting rod 42 and thereby rocks the rock lever 31, by which the connecting rod 38 is reciprocated, thereby imparting an oscillating movement to the arm 28 on the shaft 26, which causes the pawl 29 to impart an intermittent rotary movement to the ratchet wheel 30 on the hollow shaft 12, by which the drum 11 is intermittently rotated, and consequently the belt 15 which is operated by the said drum.

Upon the upper edges of the side bars 4 are secured guides 60 in which are mounted slide bars 61, which are connected at their forward ends by links 62, with the upper ends of the oscillating arms 27 and 28 respectively. The rear portions of these slide bars are provided with upwardly extending ears 63, to which are pivotally secured the forward ends of short bars 64, the opposite ends of which are provided with depending fixed pawls 65, which are adapted to engage ratchet teeth 66 which are formed in the upper edges of bars 67, which extend beyond the end of the frame 1, and also beyond the end of the table 10, which also extends beyond the end of the frame.

The bars 67 extend slidably through guides 68, on the rear ends of the side bars 4, and their forward ends are T-shaped, and extend into housings 69, which are also secured upon the upper edges of the side bars 4. The closed ends of these housings are provided with threaded apertures which receive adjustment screws 70, the ends of which bear against metal blocks 71, against which are placed rubber abutment blocks 72, which cushion the return or forward strokes of the bars 67, as will be hereinafter more fully explained.

By means of the adjustment screws 70, the bars 67 can be adjusted so that the pawls 65 will simultaneously engage corresponding teeth in the bars 67, and thus both bars be engaged and moved at the same instant.

Upon the rear end of each bar 67, is secured a depending bracket 73, and to these brackets is secured a horizontal metal plate 74, which normally lies beneath and close to the forward end of the table 10, a sufficient space being left between them to admit of the free movement of the conveyer 15. The pivoted bars 64 are provided with vertically disposed pawls 75, which, as the bars 61 are moved forward by the lever arms 27 and 28, ride over ratchet toothed bars 76, which are secured to the upper edges of the side bars 4; and at the same time, the fixed pawls 65 on the ends of the hinged bars 64, each engage a tooth 66 of the bars 67, and move the said bars with the plate 74, forward above and close to a relatively narrow endless conveyer 77, which is at right angles to the conveyer 15, and is carried by a drum 78, at its rear end, and by a small roller or shaft 79 at its forward end, which drum and shaft are mounted in the frame 2, the shaft or roller 79 being mounted in slidable bearing blocks 80, which are mounted in slideways 81, the blocks being provided with hand screws 82 by which they may be adjusted to give the required tension to the conveyer.

An angle bar 83 is secured along the forward edge of the plate 74, and to each end of this angle bar is secured one end of a suitable flexible connection, such as a chain or cord 84, which extend forward over sheave wheels 85, and have weights 86 secured to their opposite ends, which exert a continuous forward pull on the plate 74.

When the plate 74 is moved forward by the engagement of the pawl 65, with the teeth 66 of the bars 67, the weights 86 are raised, and the pawls 75 slide over the teeth 76, which are oppositely set from the teeth 66, but the instant the bars 61 begin their return stroke through their connection with the oscillating arms 27 and 28, the pawls 75 engage the toothed bars 76, by which engagement they are drawn from inclined to vertical positions, and thereby lift the hinged arms 64 by which the fixed pawls 65 at the ends of the said arms 64 are disengaged from the teeth 66 of the bars 67, when the said bars are instantly and quickly retracted by the weights 86, and thus the plate 74 is restored to its position immediately beneath the forward end of the table 10. The pawls 75 are prevented from swinging beyond vertical positions by stops x.

The shock of the return stroke of the arms 67 is received by the rubber abutment blocks 72, in the housings 69, as hereinbefore described.

The function of the plate 74, and reason for the quick return movement of the same, will be explained hereinafter.

Figure 9:
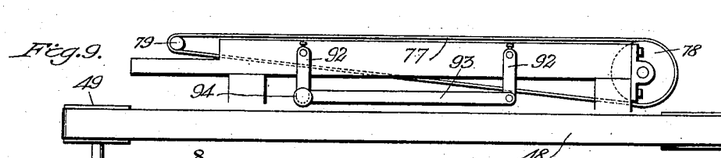
Fig. 9, is a rear side view of the cake alining conveyer and a portion of its supporting frame, showing means for varying the height of the conveyer supporting board.

The operating drum 78 of the narrow conveyer 77, is mounted on a shaft 87, supported in bearings on the adjacent end of the frame 2, and this shaft 87 carries a bevel gear 88, which meshes with and is driven by the bevel gear 47, on the shaft 44. Thus while the main conveyer is given an intermittent rotary movement by the oscillating arm 28, and its pawl 29, which engages the ratchet wheel 30, on the drum shaft 12, the conveyer 77 is given a continuous rotary movement through the continuously rotating shaft 44. The upper lap of the conveyer 77 rests upon a board 89, which is supported upon transverse shafts 90, which are mounted in the side bars of the frame 2 (see Figs. 9 and 10). These shafts 90 have cams 91, which, when the shafts are given a partial rotation, raise the board 89 and thus vary the height of the upper lap of the conveyer with respect to the quick return plate 74. The ends of the shafts 90 have short arms 92, which are connected by a connecting rod 93, which is pivotally connected to the said arms. Thus by operating the rod 93, both arms 92, together with the cam shafts 90, are turned simultaneously, and the arms are held at the desired position of adjustment by a hand screw 94, which clamps one end of the connecting rod 93, to the adjacent arm 92. From the foregoing it will be seen that cakes, crackers, or other articles which are deposited upon the main conveyer, are discharged therefrom upon the quick return plate 74, which is moved out from under the forward end of the conveyer, to receive them, and as the plate is quickly retracted the articles deposited thereon are dropped in a line upon the conveyer 77, and not in a straggling and irregular manner, as would be the case if they were discharged from the main conveyer, directly upon the conveyer 77, because in this case the articles would fall in irregular quantities upon a moving conveyer and would be in like manner discharged from the same, whereas by the employment of the receiving plate 74, a quantity of articles will accumulate upon the plate while the same is moving forward, and this quantity is dropped upon the conveyer 77, at one time, and in even line, by the quick withdrawal of the said plate 74.

Figure 12:
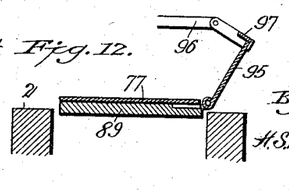
Fig. 12, is a transverse, sectional view through the second conveyer showing the hinged plate for throwing cakes back onto the said second conveyer, which have been thrown forward beyond the width of the said conveyer.
Figures 13, 17:
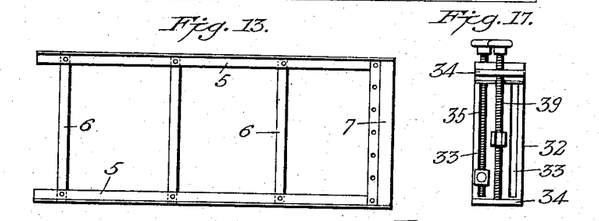
Fig. 13, is a plan view on a reduced scale, of the table supporting frame for the main conveyer.
Fig. 17, is a front view of the variable throw lever.
Figure 14:
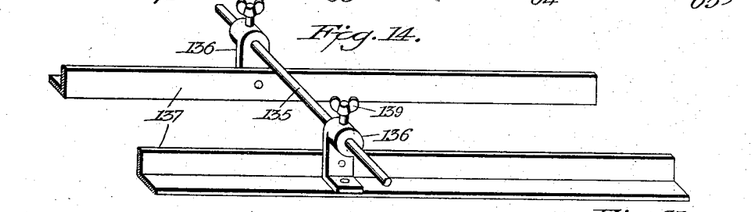
Fig. 14, is a perspective view of a portion of the laterally adjustable guides which are supported above the third or stacking conveyer.

In order to prevent cakes or other articles from being thrown beyond the conveyer 77, the adjustable board 89 over which it travels has hinged to its outer edge a metal plate 95, the upper corners of which are connected by links 96, with the forward ends of the bars 67, and the upper edge of the plate 95, terminates in a right angled lip 97. When the plate 74 is retracted, the hinged plate 95 stands in a substantially vertical position, but as the plate 74 moves out over the conveyer 77, the plate 95 assumes a horizontal position, and receives cakes that are thrown beyond the limits of the conveyer 77, the lip 97 limiting their further movement; then when the plate 74 is retracted, the hinged plate 95 is quickly swung to a vertical position, and any articles thereon are thrown backward upon the conveyer 77.

The shaft 87 carries a sprocket wheel 98, which is connected by a chain 99 with a sprocket wheel 100, on a shaft 101, which is mounted in bearings bolted to the front legs or uprights of the frame 2. The opposite end of this shaft carries a cone pulley 102, which is connected by a belt 103, with a cone pulley 104, on a shaft 105, which is mounted in bearing blocks 106 which are mounted on threaded rods 107, which are supported in suitable bearings 108 and 109, on the forward end of the frame 3. The upper ends of the rods 107 are provided with bevel gear wheels 110, which mesh with and are operated by bevel pinions 111 on a horizontal shaft 112, which is mounted in vertical portions of the bearings 109. One end of the shaft 112 carries a hand wheel 113, by turning which the bearing blocks 106 are simultaneously raised or lowered to any desired position. The shaft 105 passes through the slotted ends of the side members 114 of a transverse support, which is bolted to the under side of the forward end of an upwardly inclined board 115, the high end of which is pivotally mounted upon a shaft 116, which extends transversely across the frame 3, about midway of its length. Thus the forward end of the board 115 is raised or lowered simultaneously with the shaft 105, to vary the degree of its inclination. The shaft 116 carries a supporting roller 117 and a horizontal conveyer supporting board 118 extends from the roller 117 and flush with its uppermost surface, to within a short distance of the rear end of the frame 3. A roller 119 is mounted on the shaft 105, and a roller 120 is mounted in bearing blocks 121, which are adjustably mounted in slideways 122, on the rear end of the frame 3, the blocks 121 being adjusted by hand screws 123, which pass through the ends of the slideways and through the blocks in the usual manner. The roller 120 forms a tightening roller for a conveyer 124, which passes around the same and also around the roller 119. The upper lap of this conveyer passes over the roller 117 and is supported by the boards 115 and 118, and the lower lap of this belt is supported midway of its length by a roller 125, mounted in the frame as shown in Fig. 4.

A chute 126, semi-circular in cross section, is supported at one end on the discharge end of the frame 2, and its opposite end is supported on the frame 3, above the receiving end of the inclined portion of the conveyer 124. A short chute 127 extends from the discharge end of the conveyer 77, to the chute 126, so as to receive the articles discharged from the conveyer 77, and deliver them to the chute 126 by a sliding movement, and thus break the fall of the articles, which would otherwise occur. The upper edge of the chute 127 is flattened out to lie on a horizontal plane so as to coincide with the discharge end of the conveyer 77. A resilient metal strap 128 is secured at one end to one edge of the chute 126 near the discharge end thereof, and the opposite portion of this strap is provided with a plurality of holes 129, any one of which is adapted to engage a pin 130 on the opposite edge of the chute, thereby to vary the width of the discharge end of the chute, to accommodate cakes of different diameters.

Figures 4, 16:
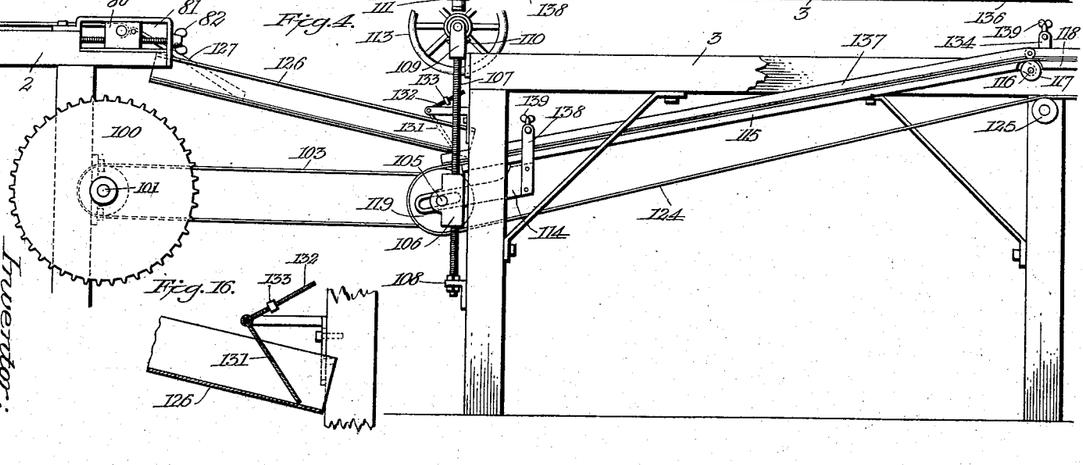
Fig. 4, is a side view of the parts shown in Fig. 3, the rear portion of the third conveyer being omitted.
Fig. 16, is a sectional view showing the device for temporarily checking the cakes in the choke chute, to allow them to accumulate in stack or column form.

A gravity stop or check plate 131 is adjustably and pivotally mounted on the forward end of the frame 3, so as to extend down into the chute 126 in the manner shown in Fig. 16. A short threaded rod 132 extends from the pivoted end of the check plate, and carries an adjustable nut 133, by which the gravity pressure of the plate may be varied.

The plate 131 is adapted to check the cakes entering the chute 126, every time the machine is started, and hold them back until they form a column or stack, when the pressure they then exert is sufficient to raise the plate and thus permit them to pass to the conveyer 124 in stack or column form, and the stack or column thus formed continues while the machine is in operation. The stop plate 131 is adapted for use more particularly in connection with round goods. As cakes or crackers of this character slide down the chute 126, their forward edges strike the stop 131, and as the stop inclines forwardly from its upper end, and as the said cakes or crackers are round, the foremost cake or cracker is automatically tipped at an inclination, with its rear edge uppermost; the next cracker slides under the first cracker and is tipped up in the same manner, and thus a column is formed and the goods remain in column form until their weight and pressure lift the stop plate 131, whereby the goods are permitted to pass in column form to the stacking conveyer 124.

Upon the side rails of the frame 3 are secured brackets 134, which support transverse rods 135, upon which are slidably mounted depending supports 136, the lower ends of which are secured to guide bars 137, which are slightly above the surface of the conveyer 124. The guide bars extend over the length of the conveyer 124, and each is made up of an inclined and a horizontal portion, answering to the corresponding portions of the conveyer 124, and the parts are hinged together at the point where the inclined portion of the belt merges into the horizontal portion, as will appear by reference to Fig. 4.

The forward ends of the inclined portions of the guides 137, however, are supported by standards 138, which are secured to the support at the forward end of the inclined board 115, so that the hinged members of the guides will move simultaneously with the inclined portion of the belt when the roller 119 is raised or lowered.

The guide bars 137 are preferably in the form of angle bars, and by sliding the supports laterally on the rods 135 the space between the guide bars 137 may be varied to suit the diameter of the cakes passing over the machine, so that the cakes are maintained in a uniform column of unvarying width during their progress toward the discharge end of the conveyer 124. The guide bars are held at the desired position of adjustment, by thumb screws 139, in threaded apertures in the supports 136, which are screwed against the rods 135, and thus hold the supports, with their rails, in the position desired.

Figures 1, 3:
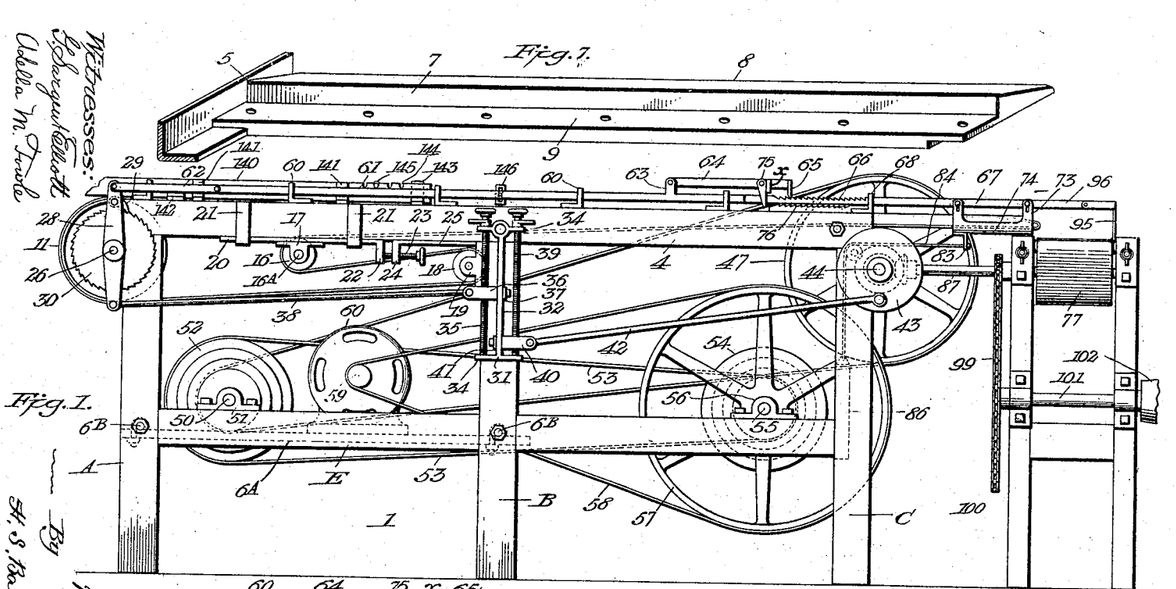
Figure 1, is a side elevation of the main conveyer and its supporting frame together with the alining conveyer at the discharge end thereof, and showing the operating mechanism for said conveyers.
Fig. 3, is a plan view of a portion of the second conveyer, the third conveyer, and the chute connecting said conveyers.
Figures 2, 8, 10:
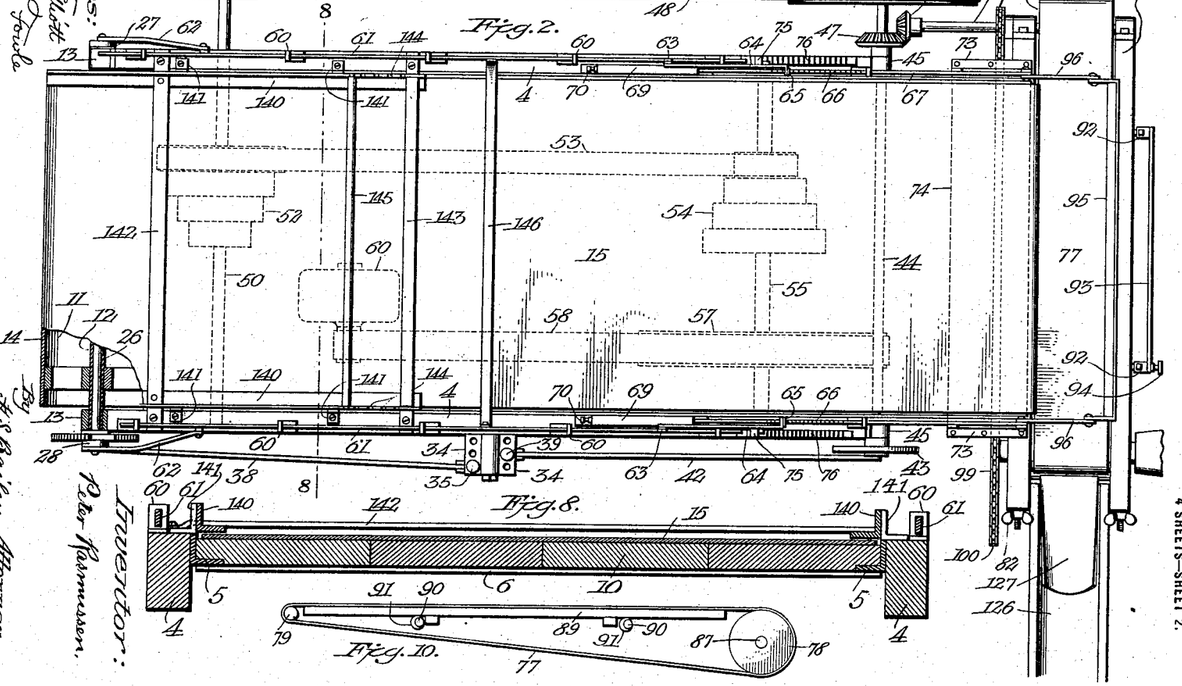
Fig. 2, is a plan view of the conveyers and operating mechanism shown in Fig. 1.
Fig. 8, is a transverse vertical sectional view through the main belt supporting table and side frames on the line 8—8 of Fig. 2.
Fig. 10, is a side view of the conveyer shown in Fig. 9, the frame being omitted to show the cam arrangement for varying the height of the conveyer supporting board.
Figure 3:
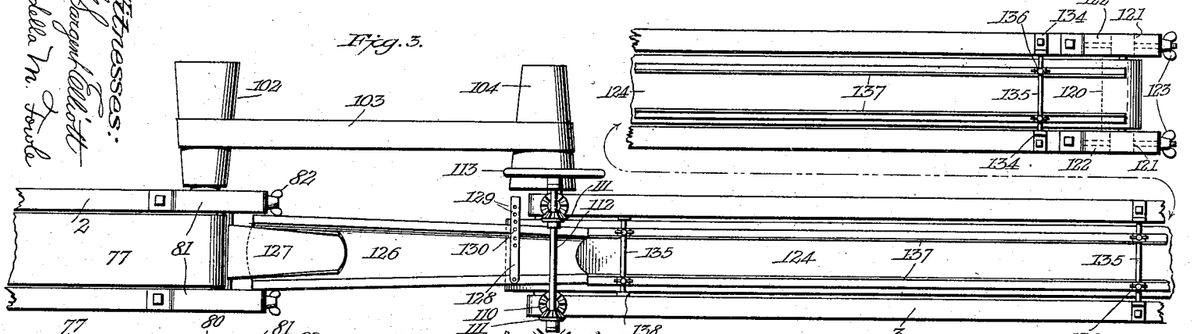

Upon the forward ends of the side rails of the main frame 1, are secured angle bars 140, which are about three feet in length and extend parallel with the said side rails. The horizontal flanges of these bars are slightly above the conveyer, and they are secured to angle plates 141 which are secured to the said side rails. The bars 140 are braced at their forward ends by a flat bar 142, which bar is secured near its ends to the horizontal flanges of the bars 140, and their ends extend through apertures in the vertical flanges of the bars and are secured to the side rails, as shown in Figs. 2 and 8. The bars 140 are braced at their rear ends by a flat bar 143, the ends of which pass through the vertical flanges of the bars and are secured to the side bars of the frame in like manner as the bar 142, and the main part of the bar is raised to stand far enough above the conveyer to be out of the way of cakes or other articles carried forward by the conveyer. This is accomplished by forming short vertical bends near the ends of the bar 143, which abut against the vertical flanges of the bars 140, the extremities of the bar being horizontally disposed to rest upon and be secured to the said side rails. The vertical flanges of the angle bars 140 are provided at their rear portions with a plurality of semi-circular recesses 144, which are adapted to receive the ends of a bar 145, upon which a baking pan may be struck by the attendant to loosen and dislodge the cakes or other articles therein, after which he rests the forward end of the pan on the horizontal flanges of the bars 140, and draws the said pan toward him, with a jerking movement which causes the cakes to drop upon the conveyer, the bar 145 being adjusted to correspond to the reach of the attendant. In order to prevent the cakes being carried forward one on top of another, I provide a leveling bar 146, which extends across the frame far enough above the conveyer to permit single cakes to pass beneath it, but when the cakes fall one upon another, the bar 146 will engage the uppermost cakes and push them onto the conveyer. The ends of the bar 146 are adjustably secured to the bars 61, so that the said bar 146 may be adjusted vertically relatively to the conveyer to accommodate cakes of different thicknesses.

The machine herein described is adapted to simplify the present method of conveying cakes delivered thereon from the oven, to a point where they are manually removed in stack or column form, and all facing in the same direction, and placed in suitable boxes or sealed packages, no attendant being required during the progress of the cakes from the time they are dumped upon the forward end of the main conveyer until they reach a point on the third conveyer, where they are manually removed in column form.

By properly adjusting the ends of the rods 38 and 42 with respect to the variable throw rock lever 31, the length of stroke of the bars 61, 64 and 67 may be varied to meet conditions arising from the nature and size of the cakes or other articles passing over the machine, and the length of the intermittent movements of the conveyer are also correspondingly increased or diminished.

The inclination of the hinged member 115 of the conveyer 124 may, by the adjusting device hereinbefore described, be varied to meet conditions, and the speed of the machine may be increased or diminished by the proper arrangement of the belts 53 and 103, with respect to their respective stepped and cone pulleys.

In operation, the machine is started and the required speed and throw movement of the parts determined. The baked articles are then deposited upon the forward end of the main conveyer in the manner before described, and they are carried forward by intermittent steps until they discharge upon the quick return receiving plate, which is moved forward from beneath the discharge end of the main conveyer, by the engagement of the pawls on the ends of the hinged bars 64, with the toothed portions of the bars 67, which support the said quick return plate. When the reciprocating bars 61, start on their return movement through their engagement with the oscillating arms 27 and 28, the pawls 75 engage the rack bars 76, as before described, and lift the pawls 65 out of engagement with the teeth of the bars 67, which are then quickly retracted by the weights 86, which are connected by flexible connections with the said quick return plate. This quick retraction of the plate 74 causes the cakes thereon to be deposited upon the continuously moving conveyer 77 in alined form, whence they slide down the chute 127 into the chute 126, whence they pass onto the inclined portion of the conveyer 124, and are carried up and along between the guide bars 137, which maintain them in stack or column form until they are manually removed from the conveyer and placed in boxes or packages.

Having described my invention, what I claim as new and desire to secure by Letters Patent, is:

1. In a machine of the character described, a main receiving endless conveyer, an endless conveyer at the discharge end of the main conveyer and at right angles thereto, power operated means for imparting an intermittent rotary movement to said main conveyer, and a continuous movement to the second conveyer, a receiving plate beneath the discharge end of the main conveyer, means connected with the operating means for moving said receiving plate forward over the second conveyer, means for quickly retracting said receiving plate, a stacking conveyer in line with the second conveyer, and means for receiving articles from the second conveyer and delivering them in stack form to the stacking conveyer.

2. In a machine of the character described, a main receiving endless conveyer, a second endless conveyer at the discharge end of the first conveyer and at right angles thereto, a pawl and ratchet operating mechanism for imparting an intermittent movement to the main conveyer, and means connected with the operating mechanism of the main conveyer for imparting a continuous movement to the second conveyer, a receiving plate extending beneath the discharge end of the main conveyer, means operated by the main conveyer operating means for moving said receiving plate forward over the second conveyer, means for releasing said receiving plate at the limit of its forward movement, and means for quickly retracting said plate.

3. In a machine of the character described, a table, a drum mounted at the receiving end of said table, an endless conveyer which passes over and under said table and around said drum, pawl and ratchet operating mechanism for imparting an intermittent rotation to said drum, a second endless conveyer at the discharge end of the first conveyer, operating means connecting the second conveyer with operating means of the first conveyer, a receiving plate extending transversely beneath the discharge end of the first conveyer, reciprocating means connected with the conveyer operating means for moving said plate forward over the second conveyer, means for releasing said plate from its forwardly moving means, at the limit of its forward movement, and means for quickly retracting said plate.

4. In a machine of the character described, a frame, a table mounted thereon, a drum mounted on the forward end of said frame, a ratchet wheel connected to said drum, a lever having a pawl to engage said ratchet wheel and means for imparting an oscillating movement to said lever, whereby an intermittent movement is imparted to said drum, an endless conveyer extending around said drum and over said table and around the forward end of said table, a plate supported beneath the forward end of said table, means connected with the drum operating means for moving said plate forward beyond the forward end of said table simultaneously with the movement of said conveyer, means for releasing said plate moving means at the limit of its forward movement, and means for quickly retracting said plate, a continuously moving conveyer at the forward end of said table above which said plate moves, a continuously moving conveyer in line with the second conveyer, a chute connecting said conveyer, and parallel laterally adjustable guides supported a slight distance above the last mentioned conveyer.

5. In a machine of the character described, a frame, a table mounted thereon, a drum mounted on the forward end of said frame, its highest point being on a level with said table, a ratchet wheel carried by said drum, levers supported at opposite ends of said drums, one of which carries a pawl to engage said ratchet wheel, means for imparting an oscillating movement to said levers, an endless conveyer which passes around said drum and over said table and around its forward end, reciprocating bars connected with said oscillating levers, a plate normally positioned beneath the forward end of said table, means operated by said reciprocating bars for imparting a forward movement to said plate, means for releasing said plate at the limit of its forward movement, and means for quickly retracting said plate, a continuously moving conveyer at the forward end of said table and at right angles thereto over which said plate moves, a continuously moving conveyer in line with the aforesaid conveyer, laterally adjustable parallel guides supported above and adjacent to said last mentioned conveyer, and a variable choke chute connecting the two alined conveyers.

6. In a machine of the character described, a main receiving endless conveyer and means for imparting an intermittent rotary movement to the same, a continuously rotating endless conveyer at the discharge end of the main conveyer and at right angles thereto, a receiving plate beneath the discharge end of the main conveyer, means connected with the main conveyer operating means for moving said plate forward over the continuously moving conveyer simultaneously with the intermittent movements of the main conveyer, means for releasing said plate from its forwardly moving means, at the limit of its forward movement, and means for quickly retracting said plate.

7. In a machine of the character described, a table, a drum mounted at the forward end of said table, an endless conveyer passing over and under said table and around said drum, means for imparting an intermittent rotary motion to said drum, an endless conveyer at the rear end of said table and at right angles thereto, and means connected with the drum operating means for imparting a continuous movement to said conveyer, a transverse receiving plate beneath the discharge end of said intermittently moving conveyer, means connected with the drum operating means for moving said plate out over the continuously moving conveyer, means for releasing the plate from its outwardly moving means at the limit of its movement, and means for quickly retracting said plate.

8. In a machine of the character described, a horizontal table, a hollow shaft mounted at the receiving end of said table, a drum on said hollow shaft, an endless conveyer passing over and under said table and around said drum, a ratchet wheel on said hollow shaft, a shaft extending loosely through said hollow shaft, levers on the ends of said latter shaft one of which carries a gravity pawl for engaging said ratchet wheel, means for imparting an oscillating movement to said levers, reciprocating parallel bars mounted on said table and connected at their forward ends to the ends of said levers, parallel bars slidably mounted on the rear portion of said table, a receiving plate normally positioned beneath the discharge end of said belt and carried by said last mentioned bars, means connecting the lever operated bars with the plate carrying bars for moving said plate carrying bars and said plate beyond the discharge end of said conveyer, means for disconnecting the plate carrying bars from the lever operated bars at the limit of the movement of the plate, gravity actuated means for quickly retracting said plate and its supporting bars, means for cushioning the return stroke of said plate carrying bars, an endless conveyer supported at the discharge end of the first conveyer, above which said plate is moved, and means connected with the drum operating means for imparting a continuous movement to said latter conveyer.

9. In a machine of the character described, the combination with a frame, a table mounted thereon, an endless conveyer which passes over and under said table, oscillating means for imparting an intermittent movement to said conveyer, and a conveyer at the discharge end of and at right angles to the first conveyer, of a receiving plate beneath the discharge end of the first conveyer, toothed bars slidably mounted on said frame and supporting said plate, bars slidably mounted on the frame and connected at one end with the conveyer operating means, short bars hinged at one end to the bars operated by the conveyer operating means, fixed pawls on the ends of hinged bars which engage said plate carrying toothed bars to move the said plate forward over the second conveyer, ratchet toothed bars secured to the frame, below the hinged bars, and swinging pawls on the said hinged bars, which ride over the teeth of the rack bars on the frame, during the forward movement of the hinged bars, but engage said teeth upon the return movement of said hinged bars, whereby the fixed pawls at the ends of said hinged bars are lifted out of engagement with the teeth of the plate carrying bars and release them; gravity actuated means for quickly retracting said plate and its supporting bars, and cushioning means for receiving the impact of the retracted bars.

10. In a machine of the character described, the combination with an endless conveyer, means for imparting an intermittent rotary movement thereto, a receiving plate beneath the discharge end of said conveyer, means operated by the conveyer operating means for moving said plate beyond the end of said conveyer, means for disconnecting the plate moving means from the conveyer operating means at the limit of its forward movement, and means for quickly retracting said plate, of an endless conveyer beneath the path of movement of said plate, and at right angles to the first conveyer, means connected with the operating means of the first conveyer for imparting a continuous rotary movement to the second conveyer, a supporting board beneath the upper lap of the second conveyer, and means for varying the plane of said board with respect to the plane of the said receiving plate.

11. In a machine of the character described, the combination with a frame, an intermittently rotating conveyer mounted thereon, a receiving plate beneath the discharge end of said conveyer, means for actuating said conveyer, means connected with the conveyer actuating means for moving said plate beyond the end of said conveyer, means for disconnecting the plate moving means from the conveyer actuating means, at the limit of its forward movement, and weights for quickly retracting said plate, of a frame at the discharge end of said conveyer, and at right angles thereto, a roller at one end of the second frame, and means connected with the conveyer operating means for imparting a continuous rotation to said roller, a roller at the opposite end of the second frame, an endless conveyer carried by said rollers and beneath the plane of travel of said receiving plate, a board for supporting the upper lap of said second conveyer, eccentric supports mounted in the second frame upon which said board rests, and means for turning said eccentrics simultaneously to vary the plane of said board, with respect to the plane of said receiving plate.

12. In a machine of the character described, the combination with an intermittently rotating main conveyer, a continuously rotating conveyer beneath the discharge end of the main conveyer, and means for operating said conveyers, of a conveyer in line with the continuously operating conveyer, means connected with the second conveyer rotating mechanism for continuously rotating the third conveyer, a resilient metal trough-shaped chute connecting the second and third conveyers, means for contracting the discharge end of said chute, parallel longitudinal guides supported above and adjacent to the third conveyer and adapted to be laterally adjusted, and means for securing said guides at the required adjusted positions.

13. In a machine of the character described, the combination with a main endless conveyer, a second conveyer at the discharge end of the first conveyer and at right angles thereto, means for imparting an intermittent rotary movement to the main conveyer, and a continuous rotary movement to the second conveyer, of a receiving plate beneath the discharge end of the main conveyer, means operated by the conveyer operating means for moving said plate over and above said second conveyer, means for disconnecting the plate moving means from the conveyer operating means at the limit of its forward movement, means for quickly retracting said plate, a vertically adjustable board for supporting the upper lap of the second conveyer, a normally vertical plate hinged to the outer edge of said board, and links connecting said plate with the said receiving plate, whereby when the said receiving plate is moved forward the hinged plate is moved to a horizontal position, and when the receiving plate is retracted the hinged plate is thrown to a vertical position.

14. In a machine of the character described, the combination with a main endless intermittently moving conveyer, an endless continuously moving conveyer at the discharge end of the main conveyer and at right angles thereto, and a vertically adjustable board for supporting the upper lap of the second conveyer, of a receiving plate supported beneath the discharge end of the main conveyer, means for moving said plate over and above the second conveyer, means for quickly retracting said plate as it reaches the limit of its forward movement, a longitudinal plate hinged to the outer edge of said adjustable board, having a normally vertical position, and links connecting said hinged plate to the supports of the said receiving plate whereby when the receiving plate is moved forward over the second conveyer the hinged plate is swung to a horizontal position, and when the receiving plate is retracted, the hinged plate is thrown to a vertical position.

15. In a machine of the character described, the combination with a main intermittently-rotating conveyer, a continuously rotating second conveyer at the discharge end of the first conveyer and at right angles thereto, a third conveyer in line with the second conveyer, the receiving end of which is arranged at an upward inclination, of a transversely-yielding resilient chute extending from the discharge end of the second conveyer, to the inclined portion of the third conveyer, means for adjustably contracting the discharge end of said chute, an automatically operating gravity stop in the discharge end of said chute, adjustable means for increasing or diminishing the resistance of said stop, and laterally adjustable parallel guides supported above and adjacent to said third conveyer.

16. In a machine of the character described, the combination with a frame, a platform mounted thereon comprising a horizontal member and an inclined member hinged thereto at one end, a vertically adjustable roller at the forward end of said frame, supports connecting the free end of said inclined member with the said adjustable roller, a roller at the opposite end of said frame, an endless conveyer carried by said rollers, the upper lap of which rests upon said horizontal and inclined members,
laterally adjustable guide rails supported above and adjacent to said conveyer, of a chute for conveying articles to the inclined end of said conveyer between said guide rails, means for adjustably contracting the discharge end of said chute, a hinged gravity controlled inclined stop in the discharge end of said chute, and means for rotating said conveyer whereby articles delivered thereon from said chute are carried forward between said guide rails.

17. In a machine of the character described, the combination with a frame of a table mounted thereon having a transverse casting on its rear end provided with a rounded edge, a drum mounted at the opposite end of the frame, the highest point of which is on a level with the table, an endless conveyer extending around said drum and over the rounded end of said casting and supported on a horizontal plane by said table, means for imparting an intermittent rotation to said drum, a receiving plate beneath the end of the conveyer which passes around the casting, means for moving said plate forward, gravity actuated means for quickly retracting said plate, and an endless conveyer beneath the plane of movement of the said plate and at right angles to the first conveyer thereby to receive goods from the main conveyer in alined order preparatory to stacking.

18. In a machine of the character described, the combination with a frame, a table mounted thereon, a hollow shaft on one end of said frame, a drum on said shaft, a shaft extending loosely through the hollow shaft, a ratchet wheel on the hollow shaft, levers on the end of the inner shaft, a gravity pawl on one of said levers to engage said ratchet wheel, means for oscillating said levers to impart an intermittent movement to said drum, and an endless conveyer extending over and under said table and around said drum, of a transverse plate under the end of said table farthest from the drum, toothed bars slidably mounted on said frame and supporting said plate, bars connected at one end to the oscillating levers, hinged arms connected to said lever operated arms having fixed pawls to engage the said plate carrying toothed bars to move said bars and plate forward beyond the end of said table, means for disconnecting said hinged arms from engagement with the toothed bars at the limit of their forward movement, means for quickly retracting said toothed bars, a transverse leveling bar adjustably secured to said lever operated bars with respect to the plane of the conveyer, and an endless conveyer beneath the path of movement of said plate.

19. In a machine of the character described, the combination with an endless delivering conveyer, an endless stacking conveyer and parallel laterally adjustable guide bars supported above but adjacent to said stacking conveyer, of a transversely-yielding resilient chute connecting the said conveyers, which is semi-circular in cross section, the discharge end of which extends between said parallel guides, means for contracting the discharge end of said chute, a hinged gravity stop plate supported to hang at an inclination in and adjacent to the discharge end of said chute, adjustable means for varying the resistance of said gravity stop, and means for rotating said conveyers.

20. In a machine of the character described, the combination with an endless delivery conveyer and an endless stacking conveyer arranged to present an inclined portion and a horizontal portion, and means for varying the inclination of the inclined portion, of laterally adjustable parallel guides supported above but adjacent to the inclined and horizontal portions of said stacking conveyer, an inclined chute extending from the delivery conveyer to the inclined portion of the stacking conveyer, its discharge end resting between said guides, an inclined plate extending from the discharge end of the delivery conveyer into the said chute, means for variably contracting the discharge end of the chute, and a gravity controlled inclined stop plate supported in and adjacent to the discharge end of the chute.

21. In a machine of the character described, an endless receiving conveyer having an intermittent movement, a relatively narrow alining endless conveyer at the discharge end of the receiving conveyer and at right angles thereto, a catching plate beneath the discharge end of the receiving conveyer, means for moving said plate forward over the alining conveyer simultaneously with the movements of the receiving conveyer, means for quickly retracting said plate, a stacking conveyer in line with the alining conveyer, combining an inclined and a horizontal portion, laterally adjustable parallel guide bars supported above but adjacent to the stacking conveyer, a chute extending from the alining conveyer and terminating between the guide bars on the inclined portion of the stacking conveyer, and means for contracting the discharge end of the chute.

In testimony whereof I affix my signature in presence of two witnesses.

PETER RASMUSSEN.

Witnesses:
G. SARGENT ELLIOTT,
ADELLA M. FOWLE.

Copies of this patent may be obtained for five cents each, by addressing the "Commissioner of Patents, Washington, D. C."